US006770839B2

(12) United States Patent
Mangiarino et al.

(10) Patent No.: US 6,770,839 B2
(45) Date of Patent: Aug. 3, 2004

(54) SYSTEM AND METHOD FOR REMOTE LASER WELDING

(75) Inventors: Carlo Mangiarino, Turin (IT);
Gianfranco Carbonato, Turin (IT);
Maurizio Gattiglio, Turin (IT);
Roberto Menin, Vico Canavese (IT)

(73) Assignees: Prima Industrie SpA, Collegno (IT);
Comau SpA, Grugliasco (IT)

( * ) Notice: Subject to any disclaimer, the term of this patent is extended or adjusted under 35 U.S.C. 154(b) by 14 days.

(21) Appl. No.: 10/058,106

(22) Filed: Jan. 29, 2002

(65) Prior Publication Data

US 2002/0104834 A1 Aug. 8, 2002

(30) Foreign Application Priority Data

Feb. 5, 2001 (IT) ..................................... TO2001A0102

(51) Int. Cl.⁷ .............................................. B23K 26/20
(52) U.S. Cl. ................................................... 219/121.63
(58) Field of Search .......................... 219/121.6, 121.63, 219/121.64, 121.78, 121.79, 121.8, 121.85

(56) References Cited

U.S. PATENT DOCUMENTS

| 4,812,613 A | 3/1989 | Gorisch |
| 4,825,036 A | 4/1989 | Bickel et al. |
| 4,892,992 A | 1/1990 | Akeel et al. |
| 4,967,053 A | 10/1990 | Aharon |
| 5,611,949 A | 3/1997 | Snellman et al. |

FOREIGN PATENT DOCUMENTS

DE        44 24 492 A1      1/1996

*Primary Examiner*—Samuel M. Heinrich
(74) *Attorney, Agent, or Firm*—Sughrue Mion, PLLC

(57) ABSTRACT

Remote laser welding system comprising a laser beam generator and an optical head (1) including a mirror orienting unit (3, 4) and a focusing device (6), to orient and focus the laser beam (P) respectively inside a spatial sector (T). The mirror orienting unit (3, 4) is also arranged to orient the spatial sector (T) on a vertical plane and the optical head (1) can be translated vertically.

13 Claims, 1 Drawing Sheet

SYSTEM AND METHOD FOR REMOTE LASER WELDING

FIELD OF THE INVENTION

The invention relates in general to remote laser welding systems, with particular reference to the welding of motor vehicle bodies and respective components.

Currently known remote laser welding systems comprise a laser beam generator and an optical unit, consisting of a optical bench, comprising mirror orienting means and focusing means, to orient and focus the laser beam, respectively, inside a truncated pyramid.

Two solutions are generally provided to orient the laser beam inside the truncated pyramid in such remote laser welding systems of the known kind: in a first case, said orienting means comprise two mirrors pivoting on reciprocally perpendicular axes (for example, each laying on the surface of the respective mirror); in the second case, said orienting means comprise one only mirror pivoting on two reciprocally perpendicular axes (for example, both laying on the surface of the mirror itself). The oscillations of the mirrors are generally controlled by galvanometric systems.

In these known solutions, the spatial orientation of the truncated pyramid for focusing the beam and providing three dimensional welding (i.e. also on surfaces arranged on planes with are not only horizontal but which also lay on vertical or slanted planes) entails a number of technical difficulties, because either the entire optical bench or the part to be welded must be angularly moved. Alternatively, several optical benches must be used. In addition to constructive complexity and to problems related to fabrication, this entails redundancy of at least one movement, because the angular movement of the optical bench or optical benches or that of the part to be welded is performed on the same plane as one of the two oscillations of the mirror orienting means in known systems described above.

SUMMARY OF THE INVENTION

The object of this invention is to obviate this shortcoming and make a remote laser welding system of the type described above capable of three-dimensional welding without the need for an additional axis for moving the optical unit, consisting of an optical bench, while providing maximum precision and operating reliability.

According to the invention, this object is reached essentially by a remote laser welding comprising a laser beam generator and an optical unit including mirror orienting means and focusing means, to orient and focus the laser beam respectively inside a spatial sector, said optical unit consisting of an optical head and said orienting means being arranged to further orient said spatial sector on a vertical plane.

According to a preferred embodiment of the invention, the orienting means comprise a stationary mirror to deviate the laser beam from a vertical direction to a horizontal position, a mobile mirror pivoting on a first horizontal axis arranged on the plane of said mobile mirror orthogonally to said horizontal direction of the laser beam, and pivoting on a second horizontal axis coinciding with said horizontal direction of the laser beam, and high dynamic actuating means for controlling the angular movements of said mobile mirror with respect to said first and said second axis.

Practically, in the remote laser welding system according to the invention, the rotation of the mobile mirror on the second horizontal axis coinciding with the axis of the incoming laser beam generates the spatial sector, conveniently formed by a spherical crown sector, unlike the traditional truncated pyramid configuration, orienting it as required on a vertical plane at the same time. This provides a considerable simplification in relation to the spatial orientation of the spatial sector, because the need of an additional controlled movement axis of the entire optical unit or the part to be welded is avoided.

According to another aspect of the invention, said focusing means comprise a focusing lens vertically moveable upstream to said stationary mirror.

This solution advantageously avoids variations of the focused laser spot in the zone to be welded, whereby ensuring a considerable rapidity in focusing.

The laser welding system according to the invention is particularly suitable for being applied on Cartesian robots for welding bodies of motor vehicles. In such applications, the robot, e.g. of the gantry type, behaves as an optical head positioner, while the part being worked is fixed, and makes the process faster by continuously tracking the focused spot during all phases of welding because repositioning of the optical head is carried out at the same time as the welding. Thanks to the possibility of directing the focused laser beam inside the three-dimensionally adjustable spatial sector, the remote laser welding system according to the invention is capable of complex welding also along vertical surface or surfaces which are however spatially oriented.

BRIEF DESCRIPTION OF THE DRAWINGS

The invention will now be described, by the way of example only, with reference to the accompanying drawings wherein.

DETAILED DESCRIPTION OF THE DRAWINGS

Figure 1:
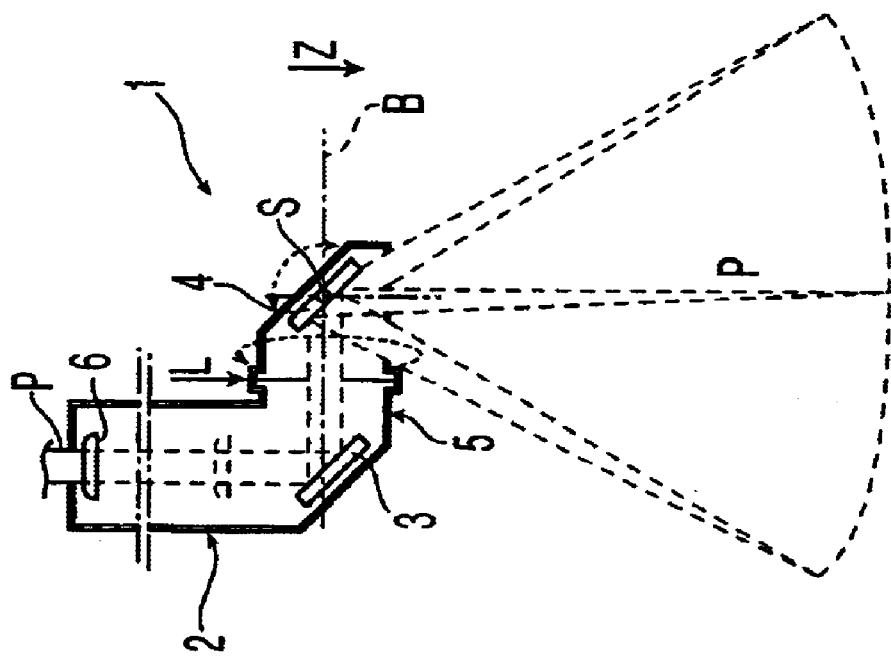
FIG. 1 is a cross-sectional vertical schematic view of an optical head which forms part of a remote laser welding system according to the invention.

With initial reference to FIG. 1, numeral 1 generally indicates an optical head of a remote laser welding system according to the invention. As mentioned above, the optical head 1 is conveniently arranged for application on a Cartesian robot for welding bodies of motor vehicles and respective components.

Said optical head 1 comprises a hollow vertical column structure 2 which is vertically moveable (Z axis) by means which are known to those skilled in the art, inside which the orienting and focusing unit of a laser beam P is inserted, the laser beam being generated, also in a way known in prior art, by a laser generator (not illustrated).

The laser beam P is conveyed inside the column 2 in a vertical direction (axis Z) and intercepts a first reflecting mirror 3, normally stationary, which deviates the beam in the horizontal direction (axis B).

The laser beam P thus intercepts a second reflecting mirror, or mobile mirror, 4 housed in a horizontal portion 5 of the body 2 of the head 1, which pivots on a horizontal axis contained on its own plane and arranged perpendicularly with respect to the horizontal direction B of the laser beam P. This pivoting axis is indicated with reference letter S. As clearly appears in FIG. 1, the laser beam P thus deviated by the mobile mirror 4 output from the horizontal portion 5 can turn, for example, by an angle in the order of ±15° with respect to the vertical.

Figure 2:
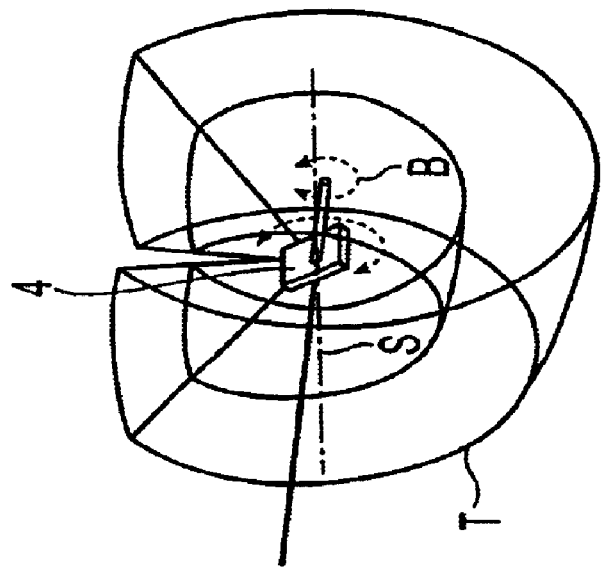
FIG. 2 is a perspective schematic view of one of the components of the optical head in FIG. 1 which exemplifies operation.

According to the fundamental characteristic of the invention, the mobile mirror 4 is also turnable (autonomously or as a whole with the entire horizontal portion 5) on the horizontal axis B, coinciding with the horizontal direction of the laser beam P reflected by the stationary mirror 3. Thanks to this rotation, which amplitude, that is unlimited in theory, can be, for example, in the order of ±140°, the optical orienting unit formed by the mirrors 3, 4 of the optical head 1 directs the laser beam P in a spatial sector, exemplified by reference letter T in FIG. 2, orienting it as required without limitation on a vertical plane.

The pivoting of the mirror 4 on the axis S and the respective rotation on the axis B are controlled by a high dynamic drive system (by the way of example only, formed by direct electrical motors), instead of a conventional galvanometric system.

In an implementation of this kind, the spatial sector T presents a geometric conformation which is essentially a spherical crown sector. A different conformation, for example a truncated cone, is however possible.

Inside the spatial sector T, the laser beam P is conveniently focused on different distances for welding by means of a vertical axis focusing lens 6 arranged inside the column 2 upstream to the stationary mirror 3. The focusing lens 6 is moveable along a direction L which is parallel to the vertical axis Z.

Furthermore, the optical head 1 is in turn moveable along the vertical axis Z so to move the vertex of the spatial sector T vertically and thus reach the zone to be welded also when this zone is, for example, inside a concavity.

To sum up, the optical head 1 herein described practically consists of a four-axis column-head (Z-L-B-S), whose movements are controlled by a numeric control system capable of programmably co-ordinating the oscillating and rotating system of the mobile mirror 4 and the translation system of the focusing lens 6 with the movement of the Cartesian robot on which the optical head 1 is advantageously fitted. As explained, in such an application, the robot, for example of the gantry type, behaves as a positioner of the optical head, while the part being worked is fixed and continuously follows the focused spot during welding, making the process faster because the optical head is repositioned at the same time as the welding.

By the way of example only, in the case of described application, the working volume of the spatial sector T presents a base side comprised in the range from 900 to 1500 mm and a height in the order of 400 mm.

Naturally, numerous changes can be implemented to the construction and embodiments of the invention herein envisaged without departing from the scope of the present invention, as defined by the following claims. For example, the four-axis optical head 1 (Z-L-B-S) can be rotated on the vertical axis Z so to orient the spherical sector T not only unlimitedly on the vertical plane formed by the axes Z and B, but also on any plane of the plane beam with axis Z in common making the laser beam axis reach any point of the sphere whose centre coinciding with that of the mirror 3.

What is claimed is:

1. A remote laser welding system comprising a laser beam generator generating a laser beam along a vertical direction and an optical unit consisting of an optical head including mirror orienting means to orient said laser beam in a spatial sector and focusing means to focus the laser beam inside a spatial sector, wherein said mirror orienting means comprise stationary mirror to deviate said laser beam from a vertical direction to a horizontal direction, and a mobile mirror pivoting on a first horizontal axis arranged on the plane of said mobile mirror orthogonally to said horizontal direction and turning on a second horizontal axis coinciding with said horizontal direction to orient said spatial sector on a vertical plane, and wherein said focusing means include a focusing lens arranged upstream of said stationary mirror, said focusing lens being vertically displaceable within said head along said vertical direction so as to focus said laser beam on different distances inside said spatial sector.

2. System according to claim 1, further including high dynamic actuating means to control the angular movements of said mobile mirror respectively on said first axis and said second axis.

3. System according to claim 2, wherein the pivoting angle of said first axis is in the order of ±15°.

4. System according to claim 2, wherein the rotation angle of said second axis is in the order of ±140°.

5. System according to claim 1, wherein said spatial sector is a spherical crown sector.

6. System according to claim 1, wherein said optical head is translatable along a vertical axis.

7. System according to claim 1, wherein said optical head is applied to a robot for welding bodies and parts of motor vehicles.

8. A remote laser welding method comprising the steps of generating a laser beam along an incoming vertical direction, orienting and focusing said laser beam in a spatial sector on a zone to be welded, and wherein said laser beam is deviated within an optical head from said incoming vertical direction to a horizontal direction and is consequently oriented around a first horizontal axis, which is orthogonal to said horizontal direction, as well as around a second horizontal axis, coinciding with said direction, the focusing step being performed within said optical head upstream of the orienting step and along said vertical direction so as to focus said laser beam on different distances inside said spatial sector.

9. Method according to claim 8, wherein said horizontal direction is vertically moveable.

10. Method according to claim 8, wherein said horizontal direction is turnable around said vertical direction.

11. Method according to claim 9, said horizontal direction is turnable around said vertical direction.

12. Method according to claim 8, wherein said spatial sector is a spherical crown sector.

13. Method according to claim 8, applied to the welding of bodies and parts of motor vehicles by means of a Cartesian robot which continuously tracks the focused spot during the welding phases, while the body or part being welded is kept stationary.

* * * * *